(12) United States Patent
Qiu et al.

(10) Patent No.: US 8,602,223 B2
(45) Date of Patent: Dec. 10, 2013

(54) HIGH PERFORMANCE MEMBRANE

(75) Inventors: Jun Qiu, Weert (NL); Rudy Rulkens, Margraten (NL); Johannes L. M. OP Den Kamp, Beek (NL); Jens C Thies, Eijsden (NL)

(73) Assignee: DSM IP Assets B.V., Heerlen (NL)

( * ) Notice: Subject to any disclaimer, the term of this patent is extended or adjusted under 35 U.S.C. 154(b) by 518 days.

(21) Appl. No.: 12/743,089

(22) PCT Filed: Nov. 14, 2008

(86) PCT No.: PCT/EP2008/065593
§ 371 (c)(1),
(2), (4) Date: Aug. 13, 2010

(87) PCT Pub. No.: WO2009/063067
PCT Pub. Date: May 22, 2009

(65) Prior Publication Data
US 2010/0305217 A1    Dec. 2, 2010

(30) Foreign Application Priority Data
Nov. 15, 2007  (EP) ..................................... 07022189

(51) Int. Cl.
*B01D 71/26*    (2006.01)
*B01D 71/56*    (2006.01)

(52) U.S. Cl.
USPC ................. 210/500.38; 210/500.36; 210/650; 210/653; 210/321.83; 210/321.84; 210/321.85; 95/45; 96/4

(58) Field of Classification Search
USPC ............. 210/500.37, 500.36, 500.38, 500.39, 210/650, 653, 321.83, 321.84, 321.85; 95/45; 96/4
See application file for complete search history.

(56) References Cited

U.S. PATENT DOCUMENTS

| | | | | |
|---|---|---|---|---|
| 4,501,793 | A | * | 2/1985 | Sarada .......................... 428/315.5 |
| 5,209,850 | A | * | 5/1993 | Abayasekara et al. ..... 210/500.36 |
| 5,512,360 | A | * | 4/1996 | King ............................... 428/304.4 |
| 5,529,686 | A | * | 6/1996 | Hagen et al. ................. 210/198.2 |
| 5,547,551 | A | * | 8/1996 | Bahar et al. ...................... 204/296 |
| 5,627,217 | A | * | 5/1997 | Rilling et al. ..................... 521/50 |
| 5,630,941 | A | * | 5/1997 | Burger et al. ..................... 210/490 |
| 6,280,791 | B1 | | 8/2001 | Meyering et al. |
| 7,584,860 | B2 | * | 9/2009 | Olson ............................ 210/490 |
| 2002/0144944 | A1 | * | 10/2002 | Arcella et al. ................. 210/483 |
| 2008/0011676 | A1 | * | 1/2008 | Olson ....................... 210/500.36 |

FOREIGN PATENT DOCUMENTS

| | | |
|---|---|---|
| EP | 1 063 004 | 12/2000 |
| JP | 5-84434 | 4/1993 |
| JP | 8-131792 | 5/1996 |
| WO | WO 92/07899 | 5/1992 |
| WO | WO 2010072233 A1 * | 7/2010 |

OTHER PUBLICATIONS

Dickson et al., Development of a coating technique for the internal structure of polypropylene microfiltration membranes, 1998, Journal of Membrane Science, 148, pp. 25-36.*
International Search Report for PCT/EP2008/065593, mailed Jun. 5, 2009.
JP Official Action, "Final Rejection", Appln. No. P2010-533599 (Jul. 2, 2013).
"Organic polymer porous material" from collections of standard technique in 2004, 2005, pp. 7-8, pp. 29-30 (http://www.jpo.go.jp/shiryou/s_sonota/hyoujun_gijutsu.htm).

* cited by examiner

*Primary Examiner* — David C Mellon
(74) *Attorney, Agent, or Firm* — Nixon & Vanderhye P.C.

(57) ABSTRACT

The invention relates to a micro-porous membrane comprising a porous membrane carrier made of a first polymeric material (A) and comprising a second polymeric material (B) intimately divided throughout the porous membrane carrier, wherein the porous membrane carrier comprises a plurality of interconnected polymeric fibers, fibrils, filaments and/or lamellae having a thickness of less than 1 μm, the porous membrane carrier has an interconnected open porous structure formed by the plurality of interconnected polymeric fibers, fibrils, filaments and/or lamellae and a porosity of at least 50%; and the polymeric material (B) comprises a thermoplastic polycondensation polymer and is present in an amount of at most 30 wt. %, relative to the total weight of (A) and (B). The invention also relates to a process for preparing such a micro-porous membrane comprising steps wherein (i) a porous membrane carrier made of a first polymeric material (A) is impregnated with a polymer solution comprising a second polymeric material (B) in a solvent system (X), and (ii) the resulting impregnated membrane carrier is quenched in a non-solvent system (Y), thereby precipitating at least part of the second polymeric material (B).

23 Claims, No Drawings

HIGH PERFORMANCE MEMBRANE

This application is the U.S. national phase of International Application No. PCT/EP2008/065593 filed 14 Nov. 2008, which designated the U.S. and claims priority to EP Application No. 07022189.0 filed 15 Nov. 2007, the entire contents of each of which are hereby incorporated by reference.

The invention relates to micro-porous or separation membranes, more particularly to hydrophilic micro-porous membranes and membranes for nano-filtration, ultra-filtration, and micro-filtration. The invention also relates to a process for preparing such micro-porous membranes and to use thereof in different constructions and applications.

There are many concepts for making membranes, using different types of polymers and polymeric materials, as well as different structures made with these materials. The membranes are also made for different purposes and need to have different properties. In particular for micro-porous or separation membranes required properties include a high separation power on one hand combined with a high flux at low pressure on the other hand. Other requirements such membranes need to have, include good mechanical and optionally as well good thermal properties. The small pores needed for high separation power general are in conflict with the high porosity needed for the high flux. Also thin layers to allow for a high flux at low pressure might constitute a trade-off for the separation power and/or good mechanical and optionally thermal properties. In particular for hydrophilic membranes it is difficult to have a proper combination of properties.

One object of the invention is to provide membranes, preferably hydrophilic membranes, having a high separation power combined with a high flux, meanwhile having good mechanical and thermal properties. Another object is to provide a process for preparing membranes with such properties.

This first object has been achieved with the micro-porous membrane according to the invention, comprising a porous membrane carrier made of a first polymeric material (A) and further comprising a second polymeric material (B) intimately divided throughout the porous membrane carrier, wherein
  (a) the porous membrane carrier
    comprises a plurality of interconnected polymeric fibers, fibrils, filaments and/or lamellae having a thickness of less than 1 µm,
    has an interconnected open porous structure formed by the plurality of interconnected polymeric fibers, fibrils, filaments and/or lamellae an
    has a porosity of at least 50%; and
  (b) the polymeric material (B) comprises a thermoplastic polycondensation polymer and is present in an amount of at most 30 wt. %, relative to the total weight of (A) and (B).

The effect of the membrane according to the invention comprising the combination of the porous membrane carrier having the said characteristics with a thermoplastic polycondensation polymer or a polymeric material comprising such thermoplastic polycondensation polymer in relative low amounts intimately divided throughout the porous membrane carrier, is that the membrane combines a high flux and a high separation power with good mechanical and thermal properties.

The micro-porous membrane according to the invention can be obtained by a process comprising steps wherein a porous membrane carrier made of the first polymeric material (A) is impregnated with a solution of the second polymeric material (B) in a solvent, and the resulting impregnated membrane carrier is than quenched in a non-solvent, miscible with the solvent.

The properties of the resulting membrane are determined in large part by the microporous structure of the membrane carrier and the amount and physical properties of the thermoplastic polycondensation polymer. There is no need for having separate layers with different microporous structures within the membrane, e.g. through different impregnation steps. The low amount of second polymeric material (B) allows for a good retention of the high porosity. Through the impregnation of the polymer solution in the porous membrane carrier, it is also assumed that the second polymeric material (B) is homogenously distributed over the thickness of the porous membrane. A further advantage of this process is that no closed coating layer of the second polymeric material (B) is formed, which is presumed to be due to the low concentration of polymer in the impregnation solution and/or precipitation with the quenching liquid.

It is noted that in contrast to the present invention, without the use of a micro-porous membrane carrier, it would be very hard if not completely impossible to make a micro-porous membrane with a thermoplastic polycondensation polymer having such a nano-scale and open microstructure, or if it would be obtainable at all, it would suffer from lack of sufficient structural integrity making it very difficult to handle and process.

The polymeric fibers, fibrils and filaments having a thickness of less than 1 µm can be denoted as micro-fibres. These micro-fibres can be interconnected by knotted portions, e.g. formed in a spin-bonding process or in a film stretching process. The polymeric fibers, fibrils and filaments, and the lamellae can be observed by techniques like optical microscopy and electron microscopy. The thickness of the micro-fibres and the lamellae can be measured using the same techniques. These micro-fibres suitably have segments that are even much thinner than 1 µm, which thinner segments may be as thin as 0.1 µm or lower.

In a preferred embodiment of the invention the porous membrane carrier is a stretched polymeric layer or a spun-bound polymeric layer.

The materials that are used for the first and second polymeric materials in the membrane carrier according to the invention can be chosen from a wide range of materials with different properties.

The first polymeric material (A) may in principle comprise any polymer or blends of different polymers, including both hydrophilic and hydrophobic polymers and physical blends thereof. In practice this will be limited to polymers that can be processed and shaped into a micro-porous membrane as according to the invention.

Suitable polymers that may be comprised in the first polymeric material (A) include polyolefins, halogenated vinyl polymers, polyacrylonitriles (PAN), polysulphones (PS), including polyether sulphones (PES), polyimides (PI), including polyetherimides (PEI), polycarbonates (PC), and cellulose and derivatives thereof, or any combination or blend thereof.

The polysulphone (PS) preferably is a polyether sulphone (PES). The polyimide (PI) preferably is a polyetherimide (PEI). Examples of suitable polyolefins are polyethylene (PE) and polypropylene (PP) and PE/PP copolymers. Suitable halogen substituted vinyl polymers include polymers such as poly(vinylidene-difluoride) (PVDF), polytrifluorochloroethylene (PTFCE), and polytetrafluoroethylene (PTFE).

Preferably, polymeric material A is a hydrophobic material and also preferably comprises a polyolefin or a halogenated vinyl polymer, more preferably a polyolefin or PTFE, and most preferably a polyethylene (PE).

The PE in the hydrophobic carrier material suitably is an ultra-high molecular weight polyethylene (UHMWPE). A UHMWPE is defined by a weight average molecular weight (Mw) of at least $0.5*10^6$ g/mol. Such porous materials are available under the trade Solupor (by DSM Solupor, the Netherlands). Very suitably the UHMWPE based porous membrane carrier is a highly stretched UHMWPE. The UHMWPE may be present in the polymeric material A in an amount of, for example, at least 20 wt. %, more preferably at least 50 wt. %, relative to the total weight of the carrier material. The UHMWPE preferably has an Mw in the range of least $1.0*10^6$-$10*10^6$ g/mol.

The first polymeric material (A) may also comprise hydrophilic polymers, which might be present as such or mixed with other polymers. Suitable examples of these polymers include polyacrylamide, polyvinyl alcohols (PVA), polyacrylic acid (PAA), polyethylene glycol (PEO), polyvinylpyrrolidone (PVP), polyacrylamide, and polyvinylamine (PVAm).

The first polymeric material (A) from which the porous membrane carrier is made does not need to comprise only polymeric components. The polymeric material A may be a "filled" polymer composition, comprising other components, such as inorganic fillers. An example of a porous membrane carrier made of such a "filled" polymer composition that can be used in the present invention is Solufill, a polyolefin membrane filled with inorganic material of DSM, The Netherlands.

The thermoplastic polycondensation polymer comprised by the second polymeric material B, may in principle comprise any thermoplastic polycondensation polymer. Practically this will be limited to polymers that can be dissolved and/or dispersed in a solvent in order to enabling the impregnation into and intimately division throughout the porous membrane carrier.

Suitably, the thermoplastic polycondensation polymer comprises a polymer chosen from the group consisting of polyesters, polyamides, polyurea, polyurethanes, or a combination or blend or an elastomeric copolymer derivative thereof.

The elastomeric copolymer derivatives, known as thermoplastic elastomers (TPE), can be for example a copolyamide elastomer (TPE-A) a copolyester elastomer (TPE-E), or a polyurethane elastomer (TPE-U).

Suitable polyamides are, for example, aromatic polyamides, semi-aromatic polyamides and aliphatic polyamides, and any copolyamide thereof. The polyamides may be crystalline, liquid crystalline, semi-crystalline or amorphous, preferably a semi-crystalline aliphatic polyamide.

Suitable semi-aromatic polyamides include terephthalic acid based polyamides like PA6,T/6,6, PA9,T and PA6T/6I, as well as PAMXD,6 and PAMXDT, and copolyamides thereof.

Suitable aromatic polyamides, also known as polyaramides, are for example polyparaphyleneterephthalamides (PPTA) (commercial grades Kevlar, Twaron, Technora) and polyparapheneisophthalamides (PPIA) (commercial grades Nomex).

The aliphatic polyamides may for example be chosen from PA2 (polyglycine), PA3, PA4, PA5, PA-6, PA2,6, PA2,8, PA-6,6, PA4,6 and PA610, and copolyamides like PA6/6,6, PA4,6/6.

The copolyamide may be for example, a copolyamide of two or more aliphatic polyamides, or two or more aromatic or semi-aromatic polyamides, or combinations of one or more aliphatic polyamides and one or more aromatic or semi-aromatic polyamides. The polyamides may also be or comprise proteins like silk or keratin, as well as modified polyamides such as hindered phenol end capped PA.

Preferably the polyamide is a semi crystalline polyamide. The polyamide also preferably is an aliphatic polyamide, and apart from that preferably has a carbon/nitrogen (C/N) ratio of at most 9. More preferably, the polyamide is a semi crystalline aliphatic polyamide having a C/N ratio of less than 9, still more preferably the C/N ratio is in the range of 4-8. Suitably, said semi crystalline aliphatic polyamide is PA6, PA 6,6 or PA4,6, or a copolymer thereof, most preferably PA4,6. PA4,6 is a polyamide available under the trade name Stanyl from DSM, the Netherlands. The advantage of said preferred polyamides is that the resulting membrane has an improved hydrophilicity and higher water flux meanwhile showing improved mechanical properties and increased thermal stability.

Thermoplastic elastomers (TPE) that can be used in the present invention typically have a block-copolymeric structure, comprising hard blocks and soft blocks in with alternating order. The hard blocks in copolyamide elastomers (TPE-A), copolyester elastomers (TPE-E) and polyurethane elastomers (TPE-U) consist of repeating units comprising respectively amide groups, ester groups blocks or urethane groups. These hard blocks are typically composed of semi-crystalline material having a high melting point. The soft blocks are generally composed of amorphous materials having a low glass transition temperature and may comprise, for example, of polyester or polyether groups.

Suitable block-copolymers are, for example, copolyester-esters, copolyether-esters, copolyether-amides, copolyester-urethanes and polyether urethanes. Preferably the block-copolymer is a co-polyether-esters or copolyether amides. Also preferably the polyether block-copolymers comprise polyether soft blocks comprising ethylene oxide units. Examples of such polyether block-copolymers are Arnitel polyether esters available from DSM the Netherlands, and PEBAX polyether amides available from Arkema.

Alternatively, the blockpolyamide copolymers and blockpolyester copolymers comprise soft blacks containing units derived from dimerized fatty acids with at least 16 carbon atoms. Such block copolymers have the advantage of even better adhesion to polyolefin carrier material.

In a preferred embodiment of the invention, the first polymeric material (A) is a hydrophobic material and/or comprises a hydrophobic polymer and the second polymeric material (B) is a hydrophilic material and/or comprises a hydrophilic polymer. It has been observed that combination of a hydrophobic carrier with a hydrophilic material intimately divided therein in the micro-porous membrane according to the invention results in a high water flux at low water pressure, meanwhile retaining good separation power.

More preferably, the hydrophobic polymer is a polyolefin, and the hydrophilic polymer is a polyamide. Optionally this polyamide is mixed with another polymer, like for example polyvinylpyrrolidone (PVP). Preferably, the amount of the other polymer is kept limited to an amount of 20 wt. %, relative to the total weight of the second polymeric material (B).

The advantage of the said combination is that the resulting micro-porous membrane has a high water flux at very low water pressure, meanwhile showing other physical properties retained or even improved, such as very good thermal, hydrolytic, thermo-oxidative, mechanical and dimensional stability.

Hydrophilicity, respectively hydrophobicity, is a relative material property. The hydrophilic character of a polymer can be determined by different methods available to the person skilled in the art. Surface tension is one such method, water breakthrough pressure is another. As an ultimate test the water flux of a micro-porous membrane can be measured. The terms hydrophobic and hydrophilic are used herein as qualitative terms, in particular since an absolute borderline cannot be given, unless expressly stated otherwise. A polymer being more hydrophilic than the material used for the porous membrane carrier is denoted herein as hydrophilic polymer. Surface tension is one appropriate physical property generally used for distinguishing between hydrophilicity and hydrophobicity. Surface tensions of polymers can be accurately determined by observing whether droplets of liquids spontaneously spread or not. In a preferred embodiment the porous membrane carrier is made of a hydrophobic polymeric material with a contact angle of more than 90° and the second polymeric material (B) is a hydrophilic material with a contact angle of less than 90°.

Porous membranes made of polymeric material are restricted in their applicability by the properties of the polymers. This restriction may for instance originate from the softening point, above which the membranes lack desirable properties, such as dimensional stability, good mechanical properties and chemical resistance. Beyond the softening point, and in particular the melting temperature of the polymers, the membranes tend to deform or shrink.

In the micro-porous membrane according to the invention, the polymer in the first polymeric material (A) and the thermoplastic polycondensation polymer in the second polymeric material (B) may each be, independently from each other, an amorphous polymer or a semi-crystalline polymer characterised by a glass transition temperature (Tg) or melting temperature (Tm), respectively, which differ from each other.

In a preferred embodiment of the invention, the thermoplastic polycondensation polymer in the second polymeric material (B) is an amorphous polymer having a glass transition temperature (TgB) being higher than the melting temperature (TmA) of the polymer in the carrier material (A). Alternatively, the polymeric material (B) preferably comprises a semi-crystalline polymer having a melting temperature (TmB) being higher than the TmA of the polymer in the carrier material A. The advantage of the polymeric material (B) having a TgB or TmB being higher than the said TmA is that the micro-porous membrane has improved thermal and dimensional stability, allowing the membrane to be used at higher temperatures.

This embodiment is advantageously applied for example for membranes in battery separators which need a high dimensional stability, and in applications which need lack of deterioration during sterilization, such as sterilizable drug release plasters. For sterilization temperatures as high as 121° C. for 30 minutes, or 135° C. for 4 minutes, are applied. For this purpose the polymer material B advantageously comprises a high melting semi-crystalline polyamide.

The glass transition temperature and melting temperature referred to herein are measured by DSC methods. The term glass transition point is herein understood to be the temperature, measured according to ASTM E 1356-91 by DSC with a heating rate of 20° C./minute and determined as the temperature at the peak of the first derivative (with respect of time) of the parent thermal curve corresponding with the inflection point of the parent thermal curve.

With the term melting temperature, or melting point, is herein understood the temperature, measured according to ASTM D3418-97 by DSC with a heating rate of 10° C./min, falling in the melting range and showing the highest melting rate.

In the membrane according to the invention, the second polymeric material (B) may be present in an amount varying over a large range. It has been observed that already very low amounts of polymeric material B can be used for the preparation of the membrane according to the invention, while having a significant effect on the properties, e.g. affecting the surface properties thereof. In such a case the concentration of the polymer in the polymer solution used for the preparation of the micro-porous membrane can still be relatively low, allowing for a low viscosity and easy impregnation into the carrier. Suitably, polymeric material B is present in an amount as low as about 0.1 wt. % or even lower, while preferably, the amount of polymeric material B is at least 0.5 wt. %. Also relatively large amounts can be used, for example when the micro-porous membrane is prepared from a highly porous carrier. However, to obtain a high flux at low pressure, while maintaining a good separation power, it is preferred to keep the amount of the second polymeric material (B) limited to 30 wt. % or less. More preferably the amount is in the range of 1-25 wt. %, more preferably 2-20 wt. %, and most preferably 5-15 wt. %. Herein the wt. % is relative to the total weight of the membrane carrier and the second polymeric material (B).

The advantage of a higher amount is that the pores become smaller. The higher the amount the better the surface coverage of the carrier material will be. With a hydrophobic carrier material A, for example UHMWPE, and a hydrophilic polymeric material B, also the flux will be higher. At a certain moment the increase in water flux will level off and subsequently decrease. This will result in a tailorable optimum combination of pore size and flux, which will depend on the materials used and the required properties, and which can be determined by the person skilled in the art of preparing membranes by routine testing and experiments.

The micro-porous membrane according to the invention may have a thickness varying over a large range. Suitably, the membrane has a thickness in the range of 5-500 μm, preferably 10-200 μm, more preferably 15-150 μm, or even 20-100 μm. The thickness may be selected at will, for example, in relation to the intended application and membrane selectivity. A higher thickness may preferably be combined with a high porosity, thereby achieving an improved separation power while still having a high flux in combination with low pressure. A lower thickness allows for an even lower pressure drop over the membrane, and is suitably be combined with very small pore sizes.

The micro-porous membrane according to the invention may have a porosity and pore sizes varying over a large range. The pores may be as small as 0.01 μm or even smaller and/or as large as 100 μm or even larger. Suitably the porous membrane carrier has an average pore size of at least 0.01 μm and/or at most 20 μm, preferably at least 0.1 μm, more preferably at least 1 μm, and preferably at most 10 μm, more preferably at most 4 μm, prior to application of the polymer solution.

The micro-porous membrane typically has pores smaller than the porous membrane carrier and suitably has an average pore size of at least 1.0 nm and/or at most 20 μm, preferably at least 10 nm, more preferably at least 100 nm, and preferably at most 10 μm, more preferably at most 1 μm lower.

The average pore size can be measured indirectly with air flow techniques via the air permeability, such as Gurley or Airflux. The method that is applied for the air permeability, and from which the values have been derived for average particle size values reported in this invention, is the Gurley test method according to ISO 5636-5. As a standard measuring set up a measuring area of 6.45 cm² (1 sq. inch) and a load of 567 grams is used, and the time needed for 50 ml of air to be permeated is measured. The air permeability thus measured is expressed in s/50 ml, (wherein s=seconds and ml=millilitre). For micro-porous membranes with relative large pore sizes, for example with an average pore size of about 1 μm or more, the measuring area can be reduced, for example to 1 cm², and the volume of air to be permeated can be increased, for example 100 ml or 200 ml, to thus allowing the permeation time to be measured more accurately. The thus obtained measuring values can be recalculated to the corresponding value for the standard measuring set up, and also these modifications can be applied in accordance with ISO 5636-5. Further details are described in the experimental part further below. The relation between the Gurley (50 cc) number and air permeability is described in ISO 5636-5. The air permeability measured with Gurley, and expressed in s/50 ml, can be translated via an empirical relation into pore size in μm, by dividing the number 1,77 by the Gurley number.

Also the porosity of the original membrane carrier and that of the resulting micro-porous membrane will differ, the latter typically having a lower porosity. An advantage of the micro-porous membrane according to the invention and the methods by which it can be prepared, is that the difference is limited, likewise due to the fact that the amount of polymeric material B can be kept limited and the basic structure of the membrane carrier is largely retained during the preparation.

The porous membrane carrier has a porosity of at least 50 volume %, preferably at least 60 volume %, more preferably in the range of 70-95 volume %, still more preferably in the range of 80-92 volume %, relative to the total volume of the membrane carrier.

Since the amount of polymeric material B is low and the membrane structure is hardly changed if any by the impregnation of the polymeric material B, the porosity of the micro-porous membrane is quite well retained and can still be very high, which is highly advantageous for obtaining high flux values. The porosity of the micro-porous membrane suitably is at least 35 volume %, preferably at least 50 volume %, more preferably in the range of 60-94 volume %, still more preferably 70-90 volume %, relative to the total volume of the membrane.

The micro-porous membrane may have an average pore size varying over a large range and may be as large as 50 μm and higher, or as low as 1 nm and lower.

In a preferred embodiment of the micro-porous membrane according to the invention the porous membrane carrier (A) has pores with an average pore size of 0.01-10 μm and a porosity of at least 80 volume %, relative to the total volume of the membrane carrier, and the micro-porous membrane has an average pore size of 1 nm-1 μm and a porosity of at least 60 volume %, relative to the total volume of the micro-porous membrane.

The average pore size values mentioned here above are derived from Gurley values measured with the Gurley test method according to ISO 5636-5, expressed in s/50 ml and converted into μm by 1.77 dividing by Gurley number.

In another preferred embodiment of the invention, the micro-porous membrane has an average pore size in the range of 0.01-1.0 μm and a pure water flux of at least 3000 l/m².h.bar, more preferably at least 5000 l/m².h.bar, measured at 0.5 bar, based on dead-end measurements. Pure water is herein demineralised water.

The water flux is measured by the method according to Norm ASTM F317-72, s a standard test method for the liquid flow rate for membrane filters.

This embodiment can be achieved for example with the micro-porous membrane according to the invention wherein the membrane carrier material A consists of a hydrophobic material such as a polyolefin and/or a halogenated vinyl polymer and the polymeric material B comprises a thermoplastic polyamide rendering the micro-porous membrane into a hydrophilic membrane.

Even more preferably, the membrane carrier material A comprises a UHMWPE, the polymeric material B comprises a thermoplastic polyamide, and the micro-porous membrane has an average pore size of at most 200 nm, and the membrane exhibits a flux of 500 l/(m² h bar), preferably at least 1500 l/(m² h bar), (herein l=liter and h=hour) and even more preferably at least 3000 l/(m² h bar), at 1 bar pressure. The flux measurement herein is performed at 0.5 bar trans-membrane pressure, and converted into the corresponding value at 1 bar.

The micro-porous membrane according to the invention may advantageously comprise a second polymeric material B comprising at least one additive, preferably chosen from the group consisting of whiskers, pigments and dyes, nano-size active carbon, enzymes, pharmaceuticals, nutraceuticals, and ion exchange resins, pigments, antibacterial agents, and stabilizers, such as thermal and oxidation stabilizers.

In a particular embodiment, the thermoplastic polymer in the micro-porous membrane is crosslinked by radiation, e.g. UV radiation or electrobeam radiation. This crosslinking enhances the thermal and mechanical stability of the micro-porous membrane.

The invention also relates to the process for preparing a micro-porous membrane comprising steps wherein (i) a porous membrane carrier made of a first polymeric material (A) is impregnated with a polymer solution comprising a second polymeric material (B) in a solvent or solvent system (X), and (ii) quenched in a non-solvent or non-solvent system (Y), thereby precipitating at least part of the second polymeric material (B).

In the impregnation step the second polymeric material (B) is supposed to become homogeneously distributed over the porous structure inside the porous membrane carrier. In combination with the subsequent precipitation step, the polymeric material becomes intimately divided over the porous structure.

For the porous membrane carrier, the first polymeric material (A) and the second polymeric material (B), the same embodiments as described for the micro-porous membrane here above can be used.

The impregnation of the porous membrane carrier with the solution can be accomplished by contacting the porous membrane carrier with the solution, e.g. by soaking the porous membrane carrier in the solution, and subsequently let penetrating the solution into the pore structure of the porous membrane carrier. The penetration might be forced by applying pressure on the solution.

A solvent and a solvent-system are herein understood to be a liquid respectively a liquid composition, in which the polymer is soluble. The liquid composition might be a mixture of different liquids and/or a mixture of a liquid and one or more other components dissolved in the liquid. Unless expressly stated otherwise, the solvent and the solvent-system will be denoted herein further as solvent-system X, irrespective of whether a single liquid or multiple liquids are used, or other components are dissolved.

Analogously, a non-solvent and a non-solvent-system are herein understood to be a liquid respectively a liquid composition, in which the polymer has a limited solubility or is insoluble. The liquid composition might be a mixture of different liquids and/or a mixture of a liquid and one or more other components dissolved in the liquid. Unless expressly stated otherwise, the non-solvent and the non-solvent-system will be denoted herein further as non-solvent-system Y, irrespective of whether a single liquid or multiple liquids are used, or other components are dissolved.

The solvent-system X may optionally comprise at least one additional component other than liquids. The additional component that may be present in the solution may be, for example, an additive, or additives, like those mentioned here above, or a solubility enhancing component, such as an inorganic salt. Optionally, the addition component may be added into non-solvent system Y. Optionally, the addition component may be more preferred to add via additional coating process after the formation of micro-porous membrane.

The non-solvent-system Y may optionally comprise at least one additional component other than liquids. The additional component that may be present in the solution may be, for example, an additive, or additives, that further reduce the solubility of the polymer.

In the process according to the invention the solvent-system X preferably comprises or is an organic solvent, being either polar or non-polar organic solvent, or any mixture thereof. More preferably the solvent system X comprises an organic solvent and an inorganic salt dissolved in the organic solvent. Also preferably the non-solvent system Y comprises water.

Whereas it is preferred to modify hydrophobic membranes into hydrophilic membranes, there are many polymers that are hydrophilic compared to the hydrophobic polymers used in the hydrophobic membranes, which hydrophilic polymers are soluble in organic solvents and not in water, and which are very suitable for use in the process according to the present invention.

Solvents that can be used as solvent and/or non-solvent include both polar liquids and non-polar liquids, which can used depending on the nature of the polymer.

Suitable apolar liquids include benzene, chloroform, and tetrachloroethylene.

Examples of polar liquids include low molecular weight liquids such as alcohols, amines, amino-alcohols, carboxylic acids, amides, amides, ketones and ethers. For the alcohols, solvents such as methanol, ethanol, isopropanol, phenol, cresols, ethylene glycol, propyleneglycol, 1,3-propanediol, butanediol can be used. For the amino-alcohols, or as an alternative name, alcohol amines, monoethanol amine and diethanolamine are suitable representatives. Suitable carboxylic acids are for example, formic acid, acetic acid, citric acid, benzoic acid, and oxalylic acid. For the amides, for example N-methyl-2-pyrrolidone (NMP), N,N-dimethylformamide (DMF), dimethylsulfoxide (DMSO), N,N-dimethylacetamide (DMAC), caprolactam can be used. Examples of possible ethers are tetrahydrofuran (THF), 1,4-dioxane and crown ethers. As ketones, for example methylethylketone or 2-butylketone (MEK) may be used. Also mixtures of the above polar solvents may be used, whereas acids and amides are preferably mixed with other solvents than with each others, since together acids and amides might form salts and thus might become unusable as a solvent. Also mixtures of polar solvents with the apolar solvents might be applied where applicable. The polar solvents may optionally also be combined with water.

For polyamides a wide range of solvents may be used. Preferably, the solvents include amide based solvents, and alcohol solutions of inorganic salts. Suitable solvents for polyamides can be found, for example, in Nylon Plastics Handbuch, Melvin I Kohan, Hanser Publisher, Munich, 1995 (pages 63 and 82-84. Preferred solvents for the semi-aromatic and aliphatic polyamides are short chain aliphatic alcohols with 1-3 carbon atoms per OH functionality, preferred because it can better dissolve polyamides and salts than longer aliphatic alcohols for example methanol, ethanol, and isopropanol, in particular the corresponding salt containing alcohol solutions, since these very well dissolve the polyamides, wet well the membrane carriers comprising apolar polymers and are fully miscible with water from which the polyamides precipitate.

Optionally the solvent can contain up to 30 wt. % of the non-solvent from the non-solvent system Y. Specific advantage of the non-solvent being water is that it is easier to keep the solutions without changing properties because of the hygroscopic behaviour of many solvents and the fact that water mixes well with the solvents for polyamides.

Salts that may be comprised by the solution suitable comprise one or more of the following cations $Li^+$, $Na^+ Ca^{+2}$, $Mg^{2+}$, $Zn^{2+}$, guanidinium$^+$, $Al^{3+}$, $Fe^{3+}$ and one or more of the following anions: $F^-$, $Cl^-$, $Br^-$, $SCN^-$, $NO_3^-$, $SO_4^{2-}$, and $PO_4^{3-}$. Preferably the salt comprise calcium chloride (CaCl2), lithium chloride (LiCl), lithium nitrate ($LiNO_3$), and/or magnesium chloride ($MgCl_2$), more preferably LiCl or LiBr and $CaCl_2$ or $CaBr_2$, more preferably $CaCl_2$. Salts such as LiCl and $CaCl_2$ may suitably be dissolved in for example DMAC or methanol. CaCl2 is preferred because it is less poisonous than Li salts and is cheap.

Preferably, the alcohol has a water content between 0.01 wt. % and 5 wt. %. This avoids problems due to the hygroscopic character of the alcohol and recycling by distillation.

In a preferred embodiment, the solvent system X comprises a salt, more preferably the salt concentration is high, still more preferably at least 70%, or better at least 80% or even 90%, relative to the saturation level. The advantage of a higher salt concentration is that the affinity for water increases and the water penetrates even faster in the impregnated membrane carrier. Additionally, the higher salt concentration will greatly reduce the volatility of organic solvent, which improves the safety on large scale production and better maintains the coating solution in a constant condition for a long interval. The higher salt concentration also favours the dissolution of polar polymers and allow for higher polymer concentrations or lower viscosities, thereby contributing to shortening the time needed for the impregnation. Moreover, the higher salt concentration will contribute to even better keep the open pore structure of the membrane.

Preferably, the solvent system X comprises a polar organic solvent and the non-solvent system Y comprises water.

The thermoplastic polycondensation polymer in the second polymeric material (B) must be a soluble polymer and preferably is soluble in a solvent, in which the first polymeric material A is insoluble or soluble in such limited extent that the porous membrane carrier remains practically unaltered during the impregnation and precipitation steps.

It is clear that a polymer solution with too high a viscosity, due to too high a concentration and/or too high a molecular weight of the thermoplastic polycondensation polymer, will be difficult to impregnate into the membrane carrier, and will result in a coating at the outer surface or surfaces of the porous membrane carrier rather than forming an intimately divided and micro-structured material inside the pores of the membrane carrier. The viscosity can be kept sufficiently low by limiting the molecular weight and the concentration of the polymer in the solution.

In a preferred embodiment of the invention, the polymer solution comprises an alcohol, 0.1-30 wt. % water, 1-50 wt. % of a salt and 0.1-10 wt. % of a polyamide with a weight average molar mass (Mw) of 2-100 kg/mol. More preferably, this solution comprises either a short aliphatic alcohol with up to 3 carbon atoms, 5-20 wt. % water, 1-25 wt. % of $CaCl_2$ and/or $CaBr_2$, and/or 0.1-10 wt. % of a polyamide with C/N ratio is in the range of 4-8 with a weight average molar mass of 3-50 kg/mol. Even more preferably, the solution comprises all these elements together. Preferably, the polyamide herein is PA4,6 or PA4,6/6 or a copolyamide of PA4,6 comprising at least 50 wt. % of PA4,6 units. It is noted that the weight percentages (wt. %) herein are all are relative to the total weight of the polymer solution.

The thermoplastic polycondensation polymer may have a molecular weight varying over a large range. To enhance solubility and processability, the polycondensation polymer preferably has a weight average molecular weight (Mw) of at most 100,000, more preferably at most 50,000, and still more preferably at most 25,000. The polycondensation polymer preferably has an Mw of at least 2,000, more preferably at least 3,000, and still more preferably at least 5,000. Very suitably, the said polymer has an Mw in the range of 10,000-20,000. A thermoplastic polycondensation polymer with a higher minimum Mw is advantageous for the mechanical and thermal properties of the resulting membrane, and furthermore improves the retention during long standing filtrations. The preferred molecular weight will depend on the type of polymer. For example for polyamides, being relatively polar polymers with a tendency to form hydrogen bonds, the preferred molecular weights might be lower than for other, less polar polymers.

Suitably, the concentration of thermoplastic polycondensation polymer in the polymer solution is in the range of 0.1-10%, more preferably 0.2-5%, still more preferably 0.5-2 wt. %, relative to the total weight of the polymer solution.

The temperature of the polymer solution while being used for the impregnation and that of the non-solvent system (Y) in the quench bath may be varied independently over a wide range, and suitably are between −20° C. and 98° C., more preferably between 0° C. and 60° C., or even between 10° C. and 40° C., and most preferably 15° C. to 25° C. In the preferred embodiments of the process described above, the liquid in the quenching bath suitably comprises water or mixtures of water and alcohol, more preferably methanol or ethanol and water, or even only water. In any case the temperature has to be above the freezing point of the liquids, thus in case the liquid in the quenching bath consists purely of water, and this will be above 0° C.

The process may be accomplished in any way that is suitable for the required impregnation and quenching/sedimentation steps. The process may be a continuous process as well as a step-wise, a semi-continuous, or a batch process.

The process can be performed such that the porous membrane carrier is soaked into an impregnation bath with the polymer solution, kept therein for a time sufficient long enough for being fully impregnated with the polymer solution, removed from the impregnation bath, and subsequently soaked into a quenching bath with the quenching liquid Y for a time sufficient long for the quenching liquid to be fully penetrated into the porous membrane carrier.

Alternatively the time of soaking needed for membrane carrier to be fully impregnated might be such that during soaking the membrane carrier is partly impregnated, while at the same time the membrane is wetted with an amount of the polymer solution, sufficient for the membrane carrier to become fully impregnated shortly after removal from the impregnation bath. Prior to soaking in the quenching bath one should take care that the membrane carrier is fully impregnated with the polymer solution.

The time needed for fully impregnation of the solution (X) and penetration of the quenching liquid (Y) can be established by the skilled person by routine experiments and measurements, for example by determining the weight increase of the porous membrane carrier (A) after the first soaking step, and full precipitation of the polymer. In practice it has been observed that for low viscous polymer solutions (X) in polar organic solvents it takes only a few to only tens of seconds to fully impregnate in a micro-porous polyolefin membrane. In case the polar organic solvent used is fully miscible with water, such as with alcohols, and in particular salt containing alcohol solutions, and using water as the quenching liquid, it also takes only a few to only tens of seconds to fully penetrate into the micro-porous membrane, even in case of a micro-porous polyolefin membrane.

Optionally after removing from the impregnation bath, the impregnated membrane is kept in an air or other gas atmosphere for 0-10 minutes, preferably 0.1 to 7 minutes before contacting it with the non/solvent system. A minimum drying time has the advantage of a smoother surface while keeping the open structure inside of the membrane. This can have positive effect on minimizing protein growth for biomedical applications.

Suitably, the process is a continuous or semi-continuous process, wherein the porous membrane carrier is unwound from a first roll, optionally passed through a wetting unit, passed through a solution application unit comprising the polymer solution, passed through a quenching unit comprising the quenching liquid Y, passed through a washing and/or drying unit and/or annealing, and wherein the resulting micro-porous membrane is rewound on a second roll. Likewise throughout such a continuous process the composition of the quenching liquid might change due to a gradual increase in solvent components from solvent system X. Replenishment of fresh quenching liquid can likewise be performed throughout the process.

Alternatively, the process may be a batch process, wherein sheets or stacks of sheets of the porous membrane carrier are soaked in a first bath comprising the polymer solution, taken from the first bath and soaked into a second bath comprising the non-solvent system Y.

In the situation wherein the porous membrane carrier and the resulting micro-porous membrane have the shape of a hollow fibre, the porous membrane carrier of the continuous process and the sheets and stacks of the batch process may be replaced by the fibre or fibres of the hollow porous membrane carrier.

For hollow fibres and tubular membranes, the impregnating solution can pass through the inside of the fibres, while the quenching solution is applied to the outside of fibres, or in the opposite way. While this impregnation can be performed from bore side or shell side, the quenching solution can flow from both sides too.

The porous membrane carrier used in the process according to the invention may have a surface average weight varying over a large range and also the amount of polymeric material to be precipitated on the porous membrane carrier may vary over a large range. For example some PES and PS membranes are quite thick, for example more than 200 μm, and might even comprise a polyester sub-layer to increase mechanic strength.

The porous membrane carrier may have, for example, a surface average weight in the range of 3-300 g/m2, preferably 5-100 g/m2, more preferably 10-50 g/m2. The amount of polymeric material precipitated on the porous membrane carrier and remained after an optional washing and drying step, suitably is in the range of 0.1-20 g/m², preferably 0.5-10 g/m², more preferably 0.5-5 g/m².

The amount of polymeric material precipitated and remained may be as high as or even higher than 30 wt. %, relative to the total weight of the membrane. Preferably, amount is in the range of 1-25 wt. % preferably 2-20, more preferably 5-10 wt. %, relative to the total weight of the membrane.

The process according to the invention may comprise a further step, or further steps, wherein the impregnated and quenched membrane obtained from step (a) and (b) is either washed (e.g. rinsed with water), dyed, dried, stretched, annealed, or calendered, or any combination thereof.

The invention also relates to a membrane construction. In one embodiment the membrane construction comprises a thin micro-porous membrane film, optionally folded, wound and/or supported by a support layer, wherein the thin micro-porous membrane film consists of a micro-porous membrane according to the present invention, or any preferred embodiment thereof. The support layer can be a web or coating layer; which can e.g. be used to further enhance the mechanical properties. The micro-structured material B can contribute to the adhesion between the membrane and support layer, thereby eliminating the need of a separate adhesive, and avoiding reduction of the permeability of the membrane. The construction with a coating layer might be semi-permeable and might be used for e.g. gas separation, reverse osmosis.

In a second embodiment the membrane construction comprises a hollow membrane fibre, or a bundle of multiple hollow membrane fibres, wherein the hollow membrane fibre or fibres consist of a micro-porous membrane according to the present invention, or any preferred embodiment thereof.

The possibility of fine tuning the pore size of the micro-porous membrane and/or changing the hydrophobic nature into a hydrophilic one, and attaining high water flux, as well as endless choice of polymers for the modification, the possible use of additives and making various construction open up many applications varying over a wide range for the micro-porous membranes according to the invention.

The invention also relates to the use of a membrane according to the present invention, or any preferred embodiment thereof, or obtained by any process or method according to the invention, or any membrane construction made thereof for any of the following applications:

- molecular separations, like particle filtration, micro filtration, ultra filtration, nano-filtration, reverse osmosis, and including solvent resistant nanofiltration (SR-NF) or any solvent resistant filtration.
- gas/gas filtration
- waste water purification,
- electrochemical applications, including electro-dialysis, electro-deionization, batteries and fuel cells
- controlled release applications including pharmaceutical and nutraceutical components.
- pertraction, pervaporation and contactor applications.
- Immobilization of enzymes,
- and humidifiers
- biocompatible membranes (for example cell macro-encapsulation membranes for example for the encapsulation of islets of Langerhans).

Membranes are commonly used for separation and concentration of solutions and suspensions. They have a broad application range and can be used in several molecular separation processes like micro filtration (MF), ultra filtration (UF), nano-filtration, reverse osmosis, electro-dialysis, electro-deionization, pertraction, pervaporation. Examples of applications include waste water purification, fuel cells, controlled release of pharmaceutical components, batteries and humidifiers. Generally, porous MF and UF membranes are broadly divided into hydrophilic membranes and hydrophobic membranes according to the natural properties of the material.

The invention is further elucidated with the following non-limiting examples and comparative experiments.

The invention is further elucidated with the following examples and comparative experiments.

Test Methods

Water Permeability

The water permeability was measured with the method according to ASTM F317-72 at room temperature (20° C.) at a pressure gradient across the membrane of 500 mbar. 250 ml water is passed through the membrane under this pressure. The time elapsed for each 50 ml in the permeate side is recorded. Thereafter, the water flux is calculated according to the equation 1

$$J = Q/AtP \qquad (\text{eq 1})$$

in which J is the flux (l/m² h bar), Q is the amount of water (in litre) flowing through the membrane in the time period (t) of the measurement (in hours), A is the effective area of the membrane (m²), and P is the pressure difference through the membrane. The experiment is performed in five replicates, the five measurements are averaged, and the average value is reported.

Air Permeability

The air permeability was measured with the Gurley test method according to ISO 5636-5. For the measurements, a Gurley Densometer type B from Toyoseiki was used, with a recording the time in 0.1 seconds, with a cylinder capacity of 50 millilitres, a cylinder weight of 567 gram and a measuring surface of 6.45 square centimetres (1 square inch), and calibrated according to standard procedures.

The measurements for the individual materials were performed as follows: a strip of a membrane was cut across the width of the roll. A smooth, undamaged test specimen was placed over the clamping plate orifice and clamped. The measurement was started, and the time required for 50 millilitres of air to pass through the test specimen was determined. The test was repeated 5 times and the (average) Gurley value was recorded in seconds/50 ml.

Average Pore Size.

The average pore size was calculated by dividing the number 1.77 by the Gurley value.

Porosity Measurement

The porosity is calculated using the following equation (I):

$$\text{porosity} = \frac{\rho - \left(\frac{\text{base weight}}{\text{thickness}}\right)}{\rho} \times 100\% \qquad (I)$$

wherein:

$\rho$=Density of the micro porous polymeric matrix in g/cm³.

base weight=Average weight of the micro porous polymeric matrix per surface area in g/m² thickness=Average thickness of the micro porous polymeric matrix (in μm)

In case of the membrane comprising a membrane carrier and a micro-structured polymer material consisting of different materials for the density $\rho$ the average density calculated with equation (II) is used:

$$\rho = \frac{W1 + W2}{\frac{W1}{\rho 1} + \frac{W2}{\rho 2}} \times 100\% \qquad (II)$$

Wherein
W1=the weight % of the membrane carrier, relative to the total weight of the membrane,
W2=the weight % of the micro-structured polymer material, relative to the total weight of the membrane,
ρ1=Density of the membrane carrier matrix in g/cm³.
ρ2=Density of the micro-structured polymer material matrix in g/cm³.

Base Weight

The base weight (BW) is calculated using the following equation:

$$BW = \frac{mass}{A} \qquad (III)$$

wherein,
BW=base weight or total mass per surface area in g/m².
Mass=mass of the sample in gram.
A=surface area of the sample in m².

Base weight calculations can be based on a sample size of 100×100 mm or the total surface of a roll (total length×width)

Thickness

Is measured according to ISO4593 through a calibrated mechanical thickness scanner; type Millitron 1234-IC. The thickness scanner has a lower plane surface and an upper plane-measuring surface with a diameter of 11.3 mm (100 mm²) parallel to the lower surface. The total load on the measuring foot, type Mahr P2004MA, is 0.75 N.

Materials

PE membrane Solupor16P25A (ex DSM, The Netherlands), base weight of 15.2 g/m²; thickness 140 μm; calculated porosity around 90 volume %.

PA-4,6 Polyamide-46, viscosity number 160 ml/g (DSM The Netherlands)

Polymer Solution

A solution of 0.5 wt. %, respectively 1 wt. % of PA-4,6 in methanol saturated with CaCl₂ (about 9.7 wt. %) was prepared at room temperature.

Membrane Modification.

Pieces of the PE membrane were briefly (just a few seconds) immersed into the polymer solution, directly dipped into water, rinsed with plenty of water, and air dried.

The modified membrane resulting from the 1 wt. % PA-4,6 solution had a base weight of 17.62 g/m², corresponding with 14.5 wt. % of PA-4,6 relative to the total weight of the modified membrane.

Microscopic Inspection of the Modified Membrane.

The modified membranes according to the invention were inspected by SEM spectroscopy and compared with the starting membrane carrier. The thicknesses of the membranes were slightly reduced. The porosity was estimated to be around 85 volume %. The open surface pore structure with relatively large pores of the PE membrane had disappeared and a micro-structure with very thin fibres and film layers with a considerably reduced pore size was visible.

Properties

Mechanical Properties

The mechanical properties (tensile modulus (E') [in MPa], tensile strength at break (F) [in N], and elongation at break (dL) [in %]) were measured in a tensile test according to ISO 527 at 23° C. Results are collected in Table 1.

TABLE 1

| Mechanical properties. | | | |
|---|---|---|---|
| Membrane/treatment | F [N] | E' [MPa] | dL [%] |
| PE-membrane | 10.7 | 5.3 | 19.9 |
| Modified membrane 0.5% solution | 13.8 | 9.3 | 21.2 |
| Modified membrane 1% solution | 13.2 | 9.5 | 21.4 |

The mechanical strength and stiffness of the membranes has significantly increased by the modification according to the invention.

Water Flux and Pore Size.

The water flux of the PE membrane, as well as of the modified membrane, as such and after 3 days treatment at room temperature in a cleaning agent, were measured at 0.5 bar across membrane. The average pore size was measured with the method described above. The results are collected in Table 2.

TABLE 2

| Water Flux and Gurley number | | | |
|---|---|---|---|
| Membrane/treatment | Water flux l/(m²·h·bar) | Gurley (s/50 ml) | Pore size μm |
| PE-membrane | 0 | 3 | 0.59 |
| Modified membrane 1% solution | 9241 | 9.7 | 0.18 |
| Id. 1% NaOCL | 9241 | 13.5 | 0.13 |
| Id. 2% KOH | 7743 | 14.6 | 0.12 |
| Id. 2% H3PO3 | 8185 | 14.6 | 0.12 |

The modified membrane possessed excellent combination of small pore size and large water flux, and had excellent resistance against cleaning agents.

Thermal Properties.

For measurement of the thermal properties modified membranes were made starting from different PE membranes, designated as PE-1, PE-2 and PE-3, and modified with a 1% PA solution wherein:

PE-1=Solupor16P25A, (ex DSM, The Netherlands), base weight of 15.2 g/m²; thickness 140 μm; calculated porosity around 90 volume %.
PE-2=Solupor16P10A
PE-3=Solupor14P02E For PE-1 and the modified membrane based thereupon were the same as described above. For the modification of PE-2 and PE-3 the same 1% PA solution and same method for the modification was applied.

Circular pieces with a cross section of 5 mm of the different PE membranes and the modified membranes based thereupon were cut from the membranes and subjected to a temperature of 120° C. for 120 minutes. After cooling the shrinkage of the pieces were measured. The results have been collected in Table 3.

TABLE 3

Shrinkage values of modified PE membranes according to the invention and comparative results for non-modified PE membranes.

| | PE membrane | | PE membrane modified with 1% PA solution | |
|---|---|---|---|---|
| | X-direction [mm] | Y-direction [mm] | X-direction [mm] | Y-direction [mm] |

TABLE 3-continued

Shrinkage values of modified PE membranes according to the invention and comparative results for non-modified PE membranes.

| | | | | |
|---|---|---|---|---|
| PE-1 16P25A | 10.1 | 5.8 | 5.8 | 4.0 |
| PE-2 16P10A | 15.5 | 4.0 | 7.5 | 2.8 |
| PE-3 14P02E | 30.9 | 16.9 | 14.6 | 9.9 |

| | X-direction [%] | Y-direction [%] | X-direction [%] | Y-direction [%] |
|---|---|---|---|---|
| PE-1 16P25A | 20 | 12 | 12 | 8 |
| PE-2 16P10A | 31 | 8 | 15 | 5 |
| PE-3 14P02E | 62 | 34 | 29 | 20 |

As can be seen from these results, the modified membranes had retained their original shape much better and shrunken much less than the corresponding non-modified PE membranes.

The invention claimed is:

1. A micro-porous membrane comprising a porous membrane carrier made of a first polymeric material (A) and comprising a second polymeric material (B) intimately divided throughout the porous membrane carrier, wherein
   (a) the porous membrane carrier (i) comprises a plurality of interconnected polymeric fibers, fibrils, filaments and/or lamellae having a thickness of less than 1 μm, (ii) has an interconnected open porous structure formed by the plurality of interconnected polymeric fibers, fibrils, filaments and/or lamellae and (iii) has a porosity of at least 50%;
   (b) the first polymeric material (A) comprises a polyolefin; and
   (c) the second polymeric material (B) comprises a polyamide and is present in an amount of at most 30 wt. %, relative to the total weight of (A) and (B).

2. The micro-porous membrane according to claim 1, wherein the porous membrane carrier is a stretched polymeric layer or a spun-bound polymeric layer.

3. The micro-porous membrane according to claim 1 or 2, wherein the first polymeric material (A) has a softening point $T_A$ and the second polymeric material (B) has a softening point $T_B$, and $T_B$ is higher than $T_A$.

4. The micro-porous membrane according to claim 1 or 2, wherein the polyamide is a semi-crystalline aliphatic polyamide.

5. The micro-porous membrane according to claim 1 or 2, wherein the amount of polymeric material (B) is in the range of 1-15 wt. %, relative to the total weight of (A) and (B).

6. The micro-porous membrane according to claim 1 or 2, wherein the polymeric material (B) comprises at least one additive.

7. The micro-porous membrane according to claim 1 or 2, wherein the porous membrane carrier has a thickness of less than 200 μm.

8. The micro-porous membrane according to claim 1 or 2, wherein the porosity is at least 65%.

9. The micro-porous membrane according to claim 1 or 2, wherein the porous membrane carrier (A) has pores with an average pore size of 0.01-10 μm and a porosity of at least 80 volume %, relative to the total volume of the membrane carrier, and the micro-porous membrane has an average pore size of 1 nm-1 μm and a porosity of at least 60 volume %, relative to the total volume of the micro-porous membrane, and wherein the average pore size is obtained from a calculation wherein 1.77 is divided by a Gurley number measured according to ISO 5636-5 and expressed in s/50 ml.

10. A micro-porous membrane according to claim 1 or 2 for use in molecular separations, filtration, reverse osmosis, waste water purification, electrochemical applications, pharmaceutical or nutraceutical controlled release applications, pertraction, pervaporation and contactor applications, enzyme immobilization, and humidifiers.

11. A separation process which comprises passing a liquid and/or gas containing a component to be separated through a microporous membrane according to claim 1 or 2 to thereby separate the component from the liquid and/or gas.

12. A membrane construction comprising a microporous membrane according to claim 1 or 2, and a support layer.

13. The membrane construction according to claim 12, wherein the micro-porous membrane is folded.

14. The membrane construction according to claim 12, wherein the micro-porous membrane is wound.

15. The membrane construction according to claim 12, which is an article for use in molecular separations, filtration, reverse osmosis, waste water purification, electrochemical applications, pharmaceutical or nutraceutical controlled release application, pertraction, pervaporation and contactor applications; enzyme immobilization, and humidifiers.

16. A process for preparing a micro-porous membrane according to claim 1 or 2, comprising the steps of (i) impregnating a porous membrane carrier made of a first polymeric material (A) with a polymer solution comprising a second polymeric material (B) in a solvent system (X), and (ii) quenching the resulting impregnated membrane carrier in a non-solvent system (Y), thereby precipitating at least part of the second polymeric material (B).

17. The process according to claim 16, wherein the solvent comprises a polar organic solvent and optionally a salt, and the non-solvent comprises water or mixtures of water and alcohol.

18. The process according to claim 17, wherein the polymer solution comprises an alcohol, 0.1-30 wt. % water, 1-50 wt. % of a salt, and 0.1-10 wt. % of a polyamide with a weight average molar mass of 2-100 kg/mol, wherein the weight percentages (wt. %) are relative to the total weight of the polymer solution.

19. The process according to claim 17, wherein the solvent system (X) comprises a polar organic solvent and the non-solvent system (Y) comprises water or mixtures of water and alcohol.

20. The process according to claim 19, wherein the solvent system (X) further comprises a salt.

21. The process according to claim 16, wherein the polymer solution comprises an alcohol, 0.1-30 wt. % water, 1-50 wt. % of a salt, and 0.1-10 wt. % of a polyamide with a weight average molar mass of 2-100 kg/mol, wherein the weight percentages (wt. %) are relative to the total weight of the polymer solution.

22. The process according to claim 16, wherein the solvent system (X) comprises a polar organic solvent and the non-solvent system (Y) comprises water or mixtures of water and alcohol.

23. The process according to claim 22, wherein the solvent system (X) further comprises a salt.

* * * * *